3,484,188
REGENERATION OF ION-EXCHANGE MEDIA
Frank L. Schneider, 8 Round Hill Lane,
Port Washington, N.Y. 11050
No Drawing. Filed Oct. 12, 1965, Ser. No. 495,334
Int. Cl. C01g 1/00
U.S. Cl. 23—1     3 Claims

ABSTRACT OF THE DISCLOSURE

The present invention consists of a means of regenerating ion-exchange media by means of acid and base prepared by external electrolysis of a salt solution with simultaneous collection and utilization of the by-products of the electrolysis to furnish part of the electrical energy required for the electrolysis.

---

The primary limitation upon the use of ion exchange techniques for deionizing highly saline water is not the technical feasibility of the techniques but rather the cost of the regenerants.

A possible means of reducing this cost has been the substitution of regenerants electrolytically produced in situ in place of the usual acid and base of commerce. By immersing the ion exchange media in a solution of salt and then electrolyzing, some degree of regeneration has been achieved. The process requires, however, that the acid product of the electrolysis diffuse or move toward and through the cation exchanger to the cathode while at the same time the basic product of the electrolysis move toward and through the anion exchanger to the anode. Moreover, since the process of electrolysis results in the release of a new free anion (e.g. $Cl^-$ or $SO_4^-$) at the anode and a new cation (e.g. $Na^+$) at the cathode, these ions would accumulate around the electrodes, together with those produced by the regeneration of the spent ion exchange media. If diffusion or movement of these to the opposite electrode does not take place rapidly enough the resistance of the cell rises very quickly and reaches a point at which the rate of electrolysis falls below useful values. The degree to which such accumulation affects the electrolysis is shown by one process which requires increase of the potential across the electrodes from the original six volts to over two hundred and twenty volts.

The present invention overcomes these difficulties and offers other advantages. The objects of the invention are:

(1) To provide a means of electrolytically producing an acid regenerant and a basic regenerant for the regeneration of spent ion exchange media.

(2) To carry out such electroylsis to achieve maximum concentration of acid regenerant at one electrode and of basic regenerant at the other electrode.

(3) To minimize the interference to the electrolysis by the cation and the anion from the substance being electrolyzed or from the ion exchange media.

(4) To utilize the by-products of such electrolysis to the fullest to minimize the cost of the regenerants.

To accomplish these objects a solution of a salt such as sodium sulfate is electrolyzed in a chamber separate from and external to the containers of the ion exchange media. The reactions taking place in such an electrolysis can be summarized as follows:

Cathode: $2H_2O + 2$ electrons $= H_2 + 2OH^-$
Anode: $2H_2O = 4H^+ + O_2 + 4$ electrons By proper arrangement of the electrodes in the chamber the basic solution passing the cathode can be caused to flow into the receptacle containing the anion exchanger where it will re-convert the exchange medium into the hydroxy form while the solution passing the anode can be conducted to the cation exchanger medium where it will re-convert the exchange medium into the hydrogen form. At the same time the oxygen and hydrogen evolved by the electrolysis can be collected separately and fed into a fuel cell where they can be converted into water with the simultaneous production of electric power. The effluent from the regeneration of the cation exchanger will be a solution of a metallic (e.g. sodium sulfate) salt which can be recirculated through the electrolysis cell for further production of acid and basic regenerants.

These objects are achieved through the use of an electrolysis system or cell external to the ion exchange media containers. The system or cell consists of three adjoining chambers. The central chamber is separated from the two side chambers by the electrodes. These should present a maximum of surface without unduly impeding the flow of solution and without permitting accumulation of gas bubbles on their surfaces. They may be constructed, for example, of wire mesh or perforated metal sheet. Any horizontal surfaces of the electrodes should be sloped upward toward the side chambers as far as possible to facilitate the evolved gases flow into the side chambers. The salt solution is admitted through an inlet control valve located at the top of the central chamber. The excess salt solution is withdrawn or allowed to flow out of this central chamber through an outlet valve at the bottom of the same chamber. Adjustment of these two valves will determine the flow of solution desired through the electrodes. The two side chambers into which the electrolyzed portions of solution pass serve as degassing chambers. The hydrogen and oxygen evolved at the electrodes, having flowed or been carried past the electrodes by the flowing salt solution streams, collect at the tops of these chambers and are drawn off to be led to a fuel cell. The acidic and basic solutions are drawn off from the bottoms of the respective side chambers and then led to the proper ion exchange medium container. The non-electrolyzed solution, together with the effluent from the regeneration of the cation exchanger, can be recirculated through the electrolysis cell.

What is claimed is:

1. A process of regenerating an anion exchange material and a cation exchange material with a base and an acid respectively, comprising the steps of separately and externally electrolyzing a salt solution to generate said base and said acid, said salt being composed of a cation and an anion which are each electrolytically stable under the electrolysis conditions, collecting said generated base and acid, regenerating the said ion exchange materials by respective contact therewith, and using the resulting effluent salt solution in the electrolysis step.

2. A process as in claim 1 wherein the salt is sodium sulfate.

3. A process as in claim 1 wherein the by-products of the electrolysis are collected and used in a fuel cell to provide at least part of the energy requirements of the electrolysis.

References Cited

UNITED STATES PATENTS

| | | |
|---|---|---|
| 2,763,607 | 9/1956 | Staverman. |
| 2,793,183 | 5/1957 | Thurman. |
| 2,928,891 | 3/1960 | Justi et al. _____ 136—86 |
| 3,074,864 | 1/1963 | Gaysowski. |
| 3,124,520 | 3/1964 | Juda. |

FOREIGN PATENTS

| | | |
|---|---|---|
| 5,030 | 12/1879 | Great Britain. |
| 733,234 | 6/1955 | Great Britain. |
| 671,057 | 9/1963 | Canada. |
| 676,200 | 12/1963 | Canada. |
| 959,846 | 6/1964 | Great Britain. |

JOHN H. MACK, Primary Examiner

D. R. JORDAN, Assistant Examiner

U.S. Cl. X.R.

136—86; 204—86, 93, 98, 104, 180